US007917101B2

(12) United States Patent
Zhang et al.

(10) Patent No.: US 7,917,101 B2
(45) Date of Patent: *Mar. 29, 2011

(54) METHOD AND SYSTEM FOR A GREEDY USER GROUP SELECTION WITH RANGE REDUCTION IN TDD MULTIUSER MIMO DOWNLINK TRANSMISSION

(75) Inventors: Chengjin Zhang, La Jolla, CA (US); Jun Zheng, La Jolla, CA (US); Pieter van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1227 days.

This patent is subject to a terminal disclaimer.

(21) Appl. No.: 11/231,701

(22) Filed: Sep. 21, 2005

(65) Prior Publication Data

US 2007/0066332 A1    Mar. 22, 2007

(51) Int. Cl.
H04B 1/02       (2006.01)
H04B 7/02       (2006.01)
H03C 7/02       (2006.01)

(52) U.S. Cl. ............... 455/101; 455/166.2; 455/509; 455/513

(58) Field of Classification Search .......... 455/62, 455/115.3, 166.2, 509, 513, 69, 67.11, 101
See application file for complete search history.

(56) References Cited

U.S. PATENT DOCUMENTS 7,139,328 B2 *  11/2006  Thomas et al. ............ 375/299
2005/0265223 A1 * 12/2005  Song ........................ 370/208
2006/0268808 A1 * 11/2006  Kang ........................ 370/342

OTHER PUBLICATIONS

Behrouz Farhang-Boroujeny et al., Layering techniques for space-time communication in multi-user networks; Vehicular Technology Conference, 2003. VTC-2003 IEEE 58th Orlando, FL, USA Oct. 6-9, 2003, Piscataway, NJ, USA, IEEE, US Oct. 6, 2003; pp. 1339-1343 vol. 2, XP010700858, ISBN:0-7803-7954-3.*
E. Telatar, "Capacity of multi-antenna gaussian channels," Bell Labs Technical Journal, Jun. 1995.
G. J. Foschini, "Layered space-time architecture for wireless communication in a fading environment when using multiple antennas," Bell Labs Technical Journal, vol. 1, No. 2, pp. 41-59, 1996.
S. Caire, G. Shamai "On the achievable throughput of a multiantenna gaussian broadcast channel," IEEE Trans. on Information Theory. vol. 49, No. 7, pp. 1691-1706, 2003.

(Continued)

Primary Examiner — Tuan H Nguyen
(74) Attorney, Agent, or Firm — McAndrews, Held & Malloy, Ltd.

(57) ABSTRACT

Certain aspects of a method and system for processing signals in a communication system may include maximizing system capacity for a time division duplex (TDD) multiuser multiple-input multiple-output (MIMO) downlink system, based on a single signal for a single user within a reduced search range or the single signal for the single user and at least one other signal for one other user within a remaining portion of the reduced search range. The reduced search range may be generated by sorting a plurality of signals based on a channel gain corresponding to each of the plurality of signals. The single signal for the single user may be selected from the reduced search range corresponding to a channel gain that is greater than a channel gain corresponding to a remaining portion of the reduced search range.

21 Claims, 7 Drawing Sheets

OTHER PUBLICATIONS

C. B. Peel, B. M. Hochwald, and A. L. Swindlehurst, "A vector-perturbation technique for near-capacity multiantenna multiuser communication-Part I: channel inversion and regularization," IEEE Trans. on Communications, vol. 53, No. 1, pp. 195-202, Jan. 2005.

C. Windpassinger, R. F. H. Fischer, T. Vencel, and J. B. Huber, "Precoding in multiantenna and multiuser communications," IEEE Trans. on Wireless Communications, vol. 3, No. 4, pp. 1305-1316, 2004.

B. M. Hochwald, C. B. Peel and A. L. Swindlehurst, "A vector-perturbation technique for near-capacity multiantenna multiuser communication-Part II: perturbation," IEEE Trans. on Communications, vol. 53, No. 3, pp. 537-644, Mar. 2005.

T. Yoo and A. J. Goldsmith, "Optimality of zero-forcing beamforming with multiuser diversity," in 2005 IEEE International Conference on Communications, Seoul, Korea. May 2005, pp. 542-546.

* cited by examiner

METHOD AND SYSTEM FOR A GREEDY USER GROUP SELECTION WITH RANGE REDUCTION IN TDD MULTIUSER MIMO DOWNLINK TRANSMISSION

CROSS-REFERENCE TO RELATED APPLICATIONS/INCORPORATION BY REFERENCE

This application makes reference to:
U.S. application Ser. No. 11/232,340 filed Sep. 21, 2005;
U.S. application Ser. No. 11/232/266 filed Sep. 21, 2005;
U.S. application Ser. No. 11/231,501 filed Sep. 21, 2005;
U.S. application Ser. No. 11/231,699 filed Sep. 21, 2005;
U.S. application Ser. No. 11/231,586 filed Sep. 21, 2005;
U.S. application Ser. No. 11/232,369 filed Sep. 21, 2005;
U.S. application Ser. No. 11/232,362 filed Sep. 21, 2005;
U.S. application Ser. No. 11/231,557 filed Sep. 21, 2005; and
U.S. application Ser. No. 11/231,416 filed Sep. 21, 2005.

Each of the above stated applications is hereby incorporated by reference in its entirety.

FIELD OF THE INVENTION

Certain embodiments of the invention relate to time division duplex (TDD) multiuser multiple-input multiple-output (MIMO) downlink transmission. More specifically, certain embodiments of the invention relate to a method and system for greedy user group selection with range reduction in TDD multiuser MIMO downlink transmission.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers.

In order to meet these demands, communication systems using multiple antennas at both the transmitter and the receiver have recently received increased attention due to their promise of providing significant capacity increase in a wireless fading environment. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and to raise the degrees of freedom to suppress interference generated within the signal reception process. Diversity gains improve system performance by increasing received signal-to-noise ratio and stabilizing the transmission link. On the other hand, more degrees of freedom allow multiple simultaneous transmissions by providing more robustness against signal interference, and/or by permitting greater frequency reuse for higher capacity. In communication systems that incorporate multi-antenna receivers, a set of M receive antennas may be utilized to null the effect of (M−1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

The widespread deployment of multi-antenna systems in wireless communications has been limited by the increased cost that results from increased size, complexity, and power consumption. This poses problems for wireless system designs and applications. As a result, some initial work on multiple antenna systems may be focused on systems that support single user point-to-point links. However, the use of multi-antenna techniques for a multiuser environment to improve total throughput remains a challenge.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for greedy user group selection scheme with range reduction in time division duplex (TDD) multiuser multiple-input multiple-output (MIMO) downlink transmission, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

downlink transmission system with linear preceding, in accordance with an embodiment of the invention.

Figure 1A:
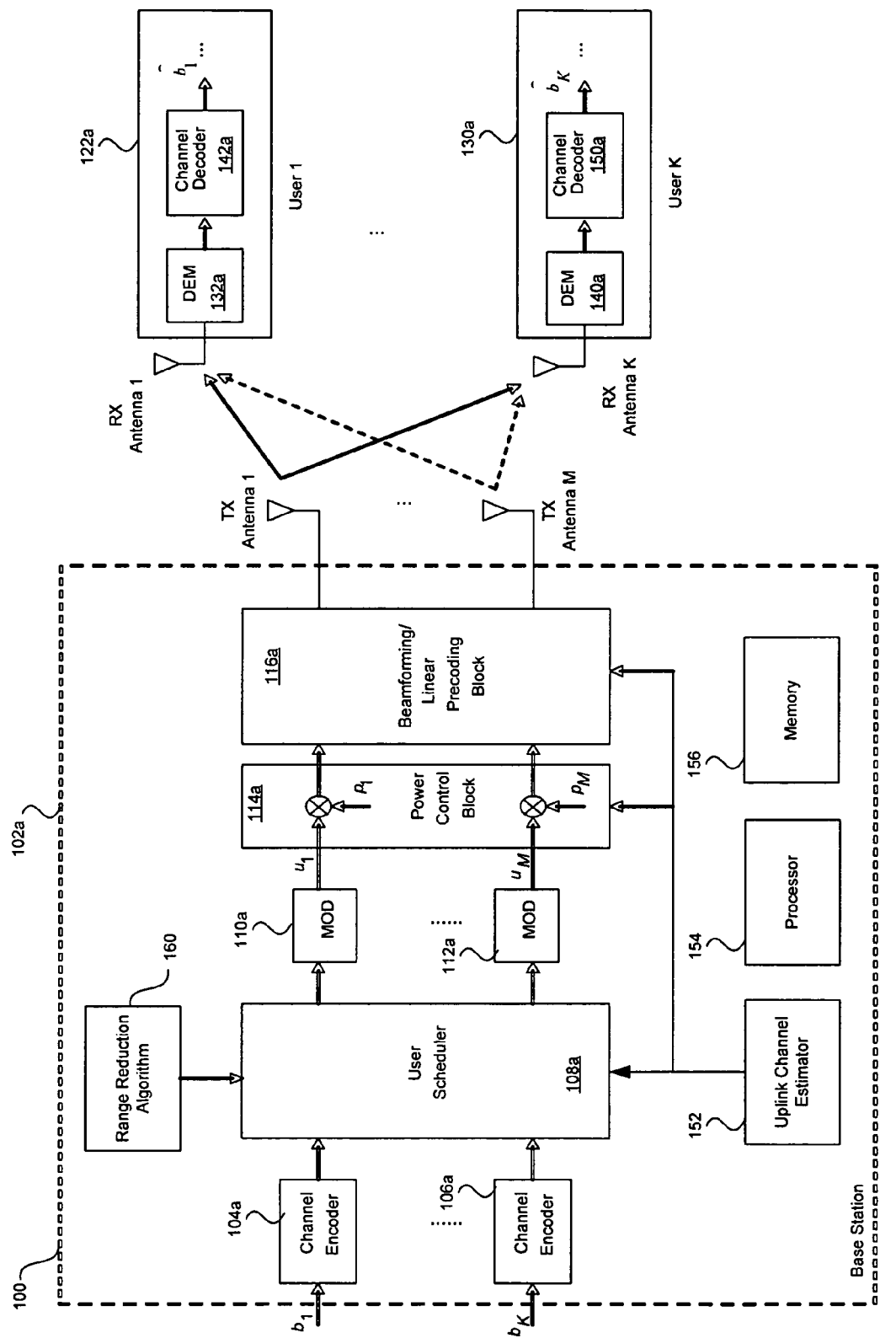
FIG. 1A is a top-level block diagram illustrating an exemplary multiuser multiple-input-multiple-output (MIMO)
Figure 1B:
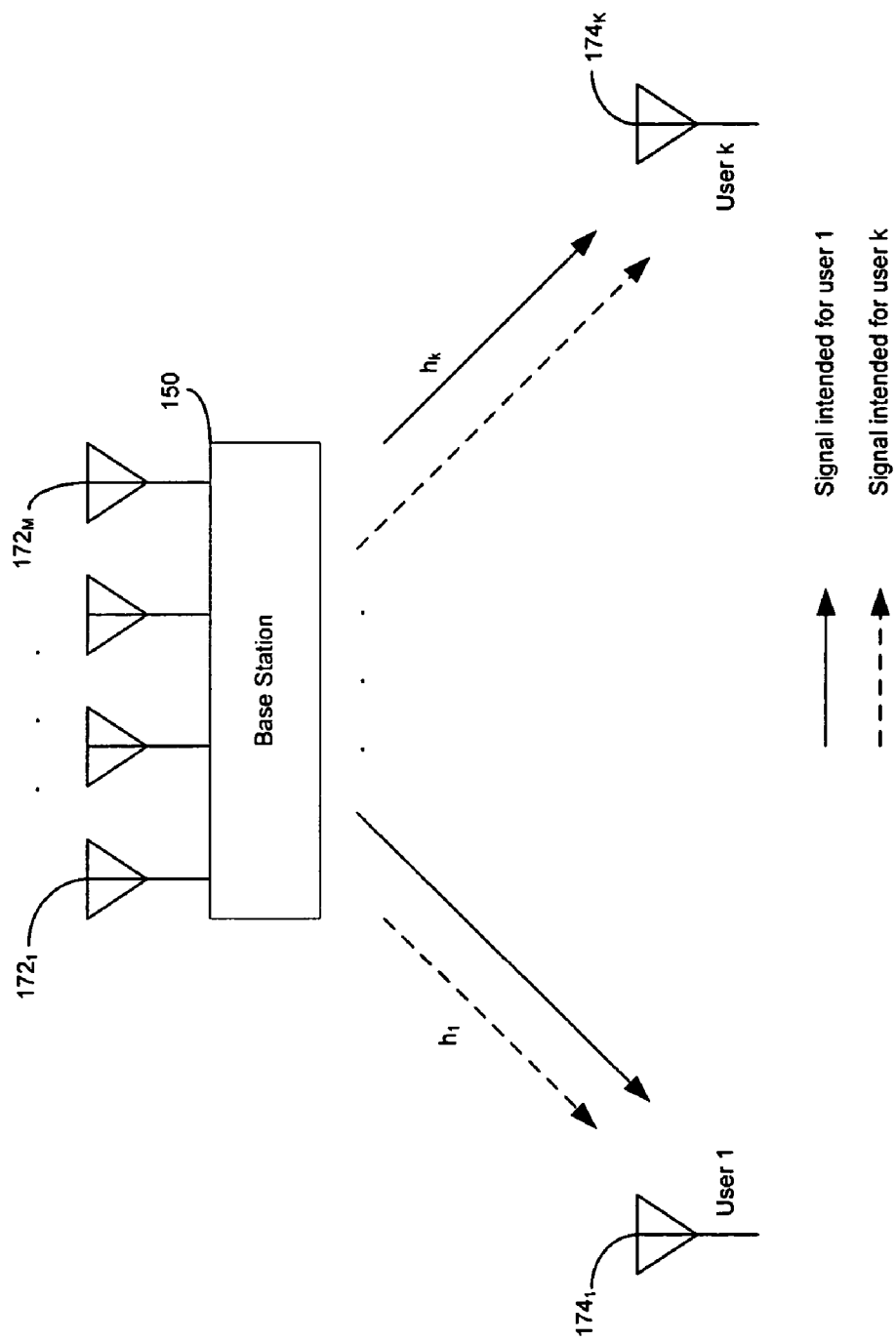

FIG. 1B illustrates a block diagram of a multiuser downlink communication environment that may be utilized in connection with an embodiment of the invention.

Figure 2A:
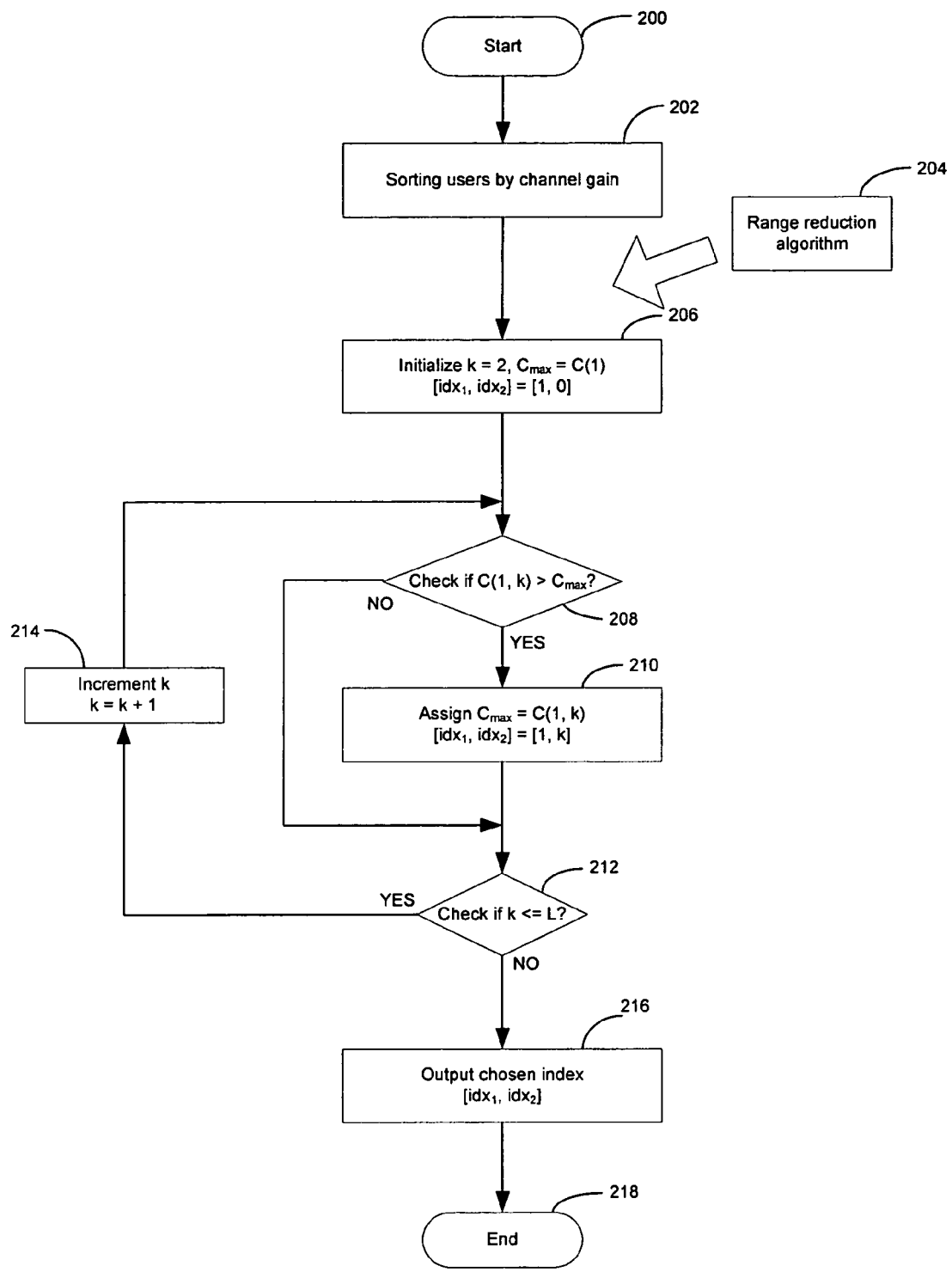

FIG. 2A is a flowchart illustrating greedy user group selection with range reduction, in accordance with an embodiment of the invention.

Figure 2B:
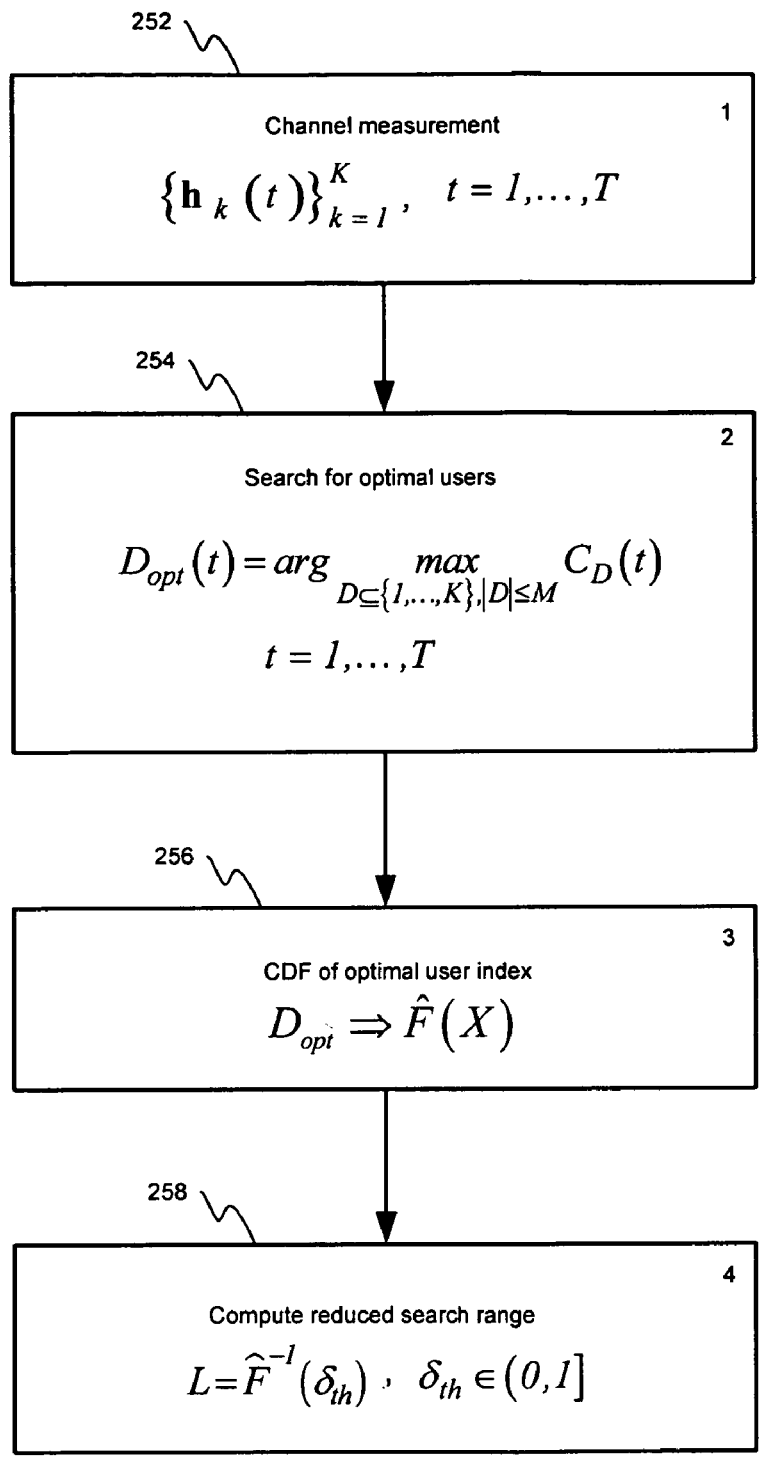

FIG. 2B is a flow chart that illustrates exemplary steps in a method for a range reduction scheme for user selection in a multiuser MIMO downlink transmission, in accordance with an embodiment of the invention.

Figure 3:
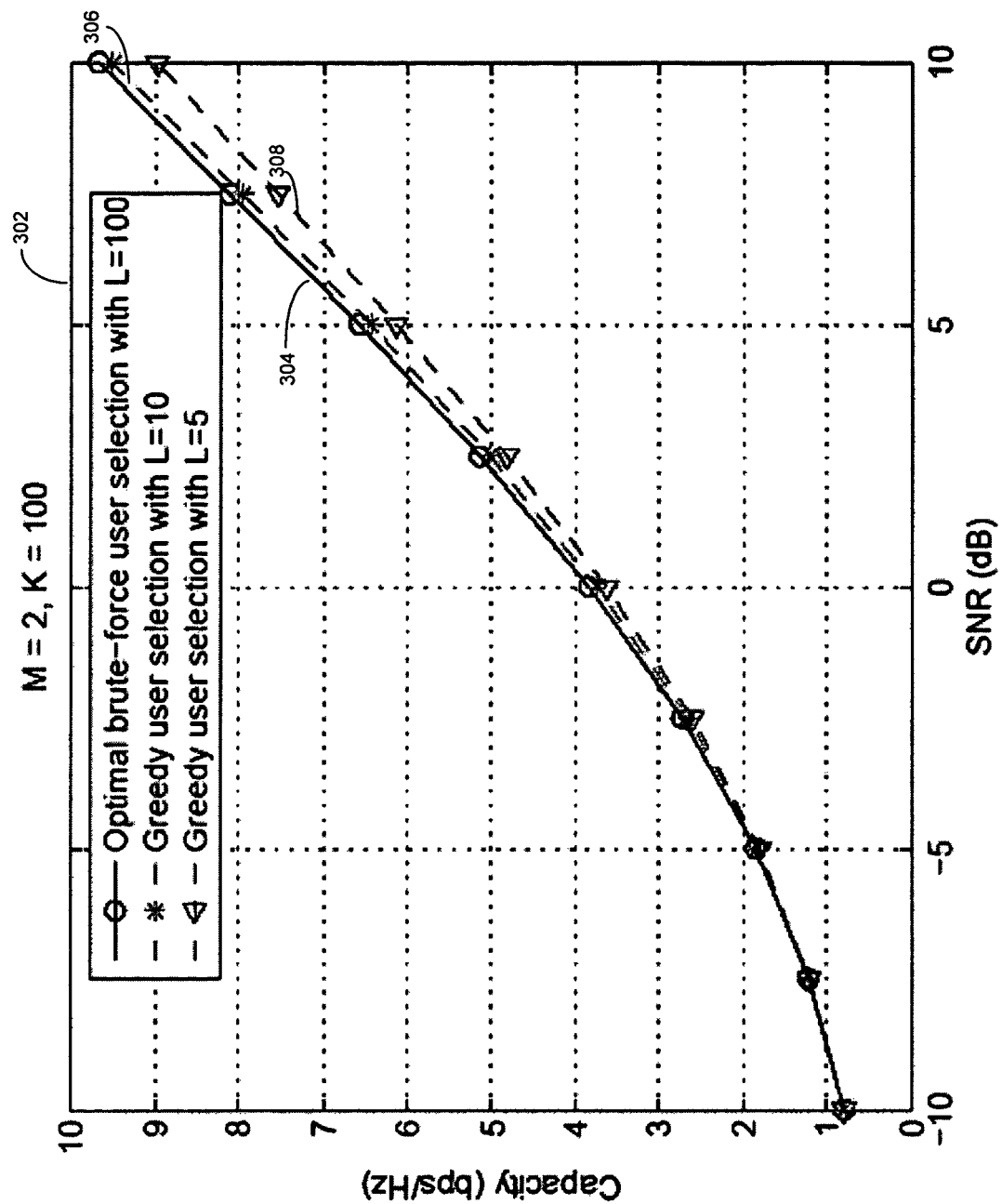

FIG. 3 is a graph illustrating a comparison of sum capacity of a system using an optimal brute force user selection with L=100, a greedy user selection with L=10 and a greedy user selection with L=5, in accordance with an embodiment of the invention.

Figure 4:
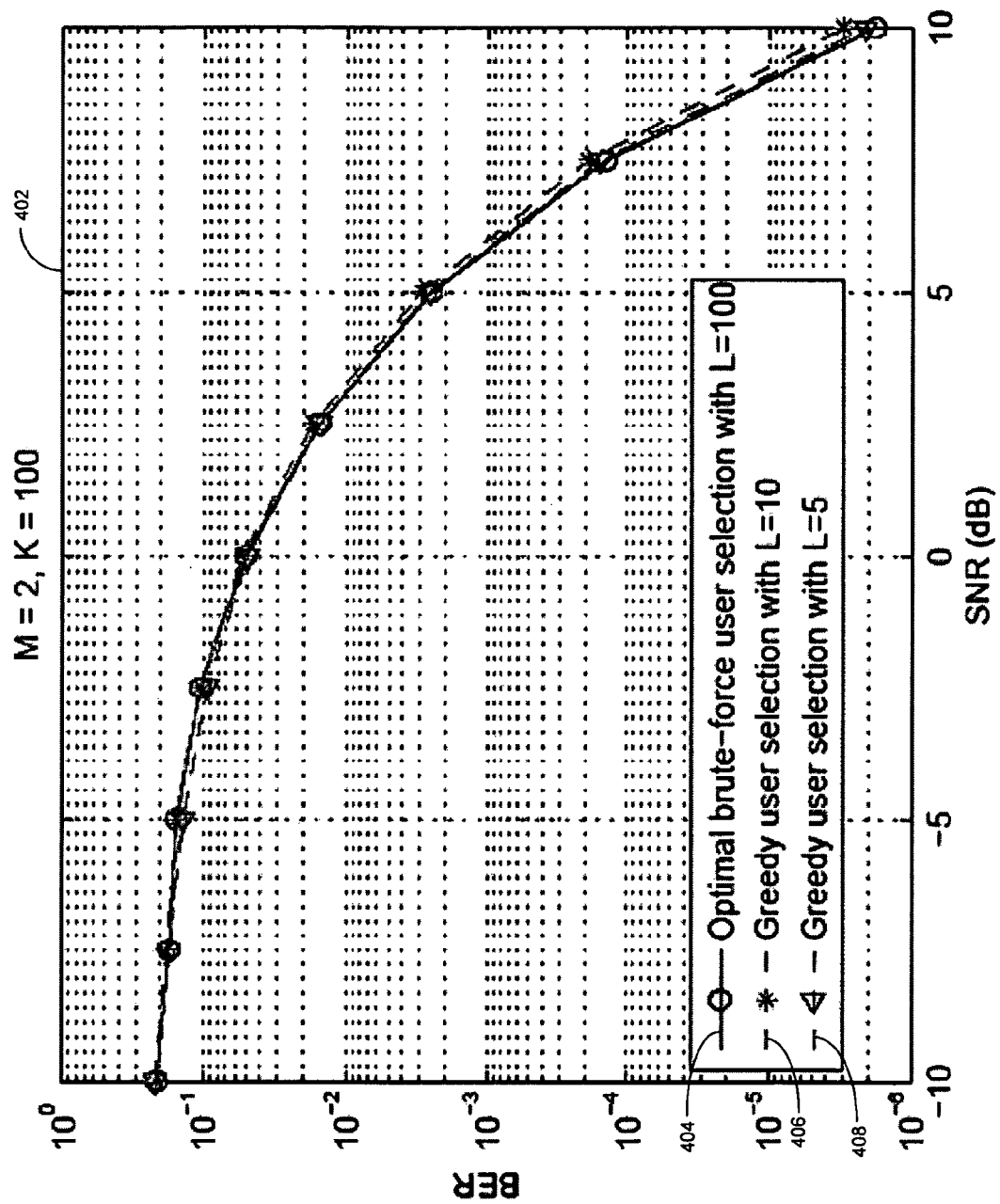

FIG. 4 is a graph illustrating a comparison of bit error rate (BER) of a system using an optimal brute force user selection with L=100, a greedy user selection with L=10 and a greedy user selection with L=5, in accordance with an embodiment of the invention.

Figure 5:
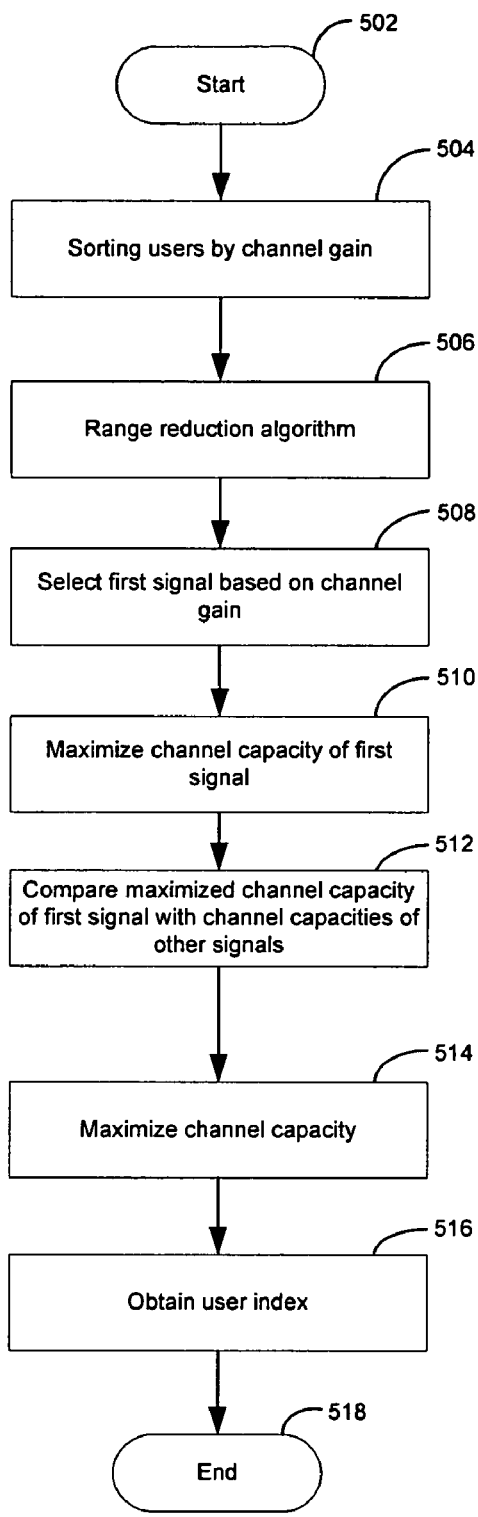

FIG. 5 is a flowchart illustrating a greedy user group selection scheme with range reduction in TDD multiuser MIMO downlink transmission, in accordance with an embodiment of the invention.

DETAILED DESCRIPTION OF THE INVENTION

Certain aspects of a method and system for processing signals in a communication system may include maximizing system capacity for a time division duplex (TDD) multiuser multiple-input multiple-output (MIMO) downlink system, based on a single signal for a single user within a reduced search range provides a maximized system capacity or the single signal for the single user and at least one other signal for one other user within a remaining portion of the reduced search range. The reduced search range may be generated by sorting a plurality of signals based on a channel gain corresponding to each of the plurality of signals. The single signal for the single user may be selected from the reduced search range corresponding to a channel gain that is greater than a channel gain corresponding to a remaining portion of the reduced search range.

U.S. application Ser. No. 11/231,586 filed Sep. 21, 2005, provides a detailed description of a double search user group selection with range reduction in TDD multiuser MIMO downlink transmission, and is hereby incorporated by reference in its entirety. In this regard, a double search user group selection with range reduction for maximizing system capacity is provided by that application. The present application discloses using a greedy search user group selection with range reduction for maximizing system capacity. An exemplary implementation of a greedy search user group selection scheme is described in "Optimality of zero-forcing beamforming with multiuser diversity," by T. Yoo and A. J. Goldsmith, 2005 IEEE International Conference on Communications, Seoul, Korea, May 2005, pp. 542-546. The relevant portions of which are hereby incorporated herein by reference. The greedy search generally refers to methods for choosing users for a user group that possess the strongest signal gain.

FIG. 1A is a top-level block diagram illustrating an exemplary multiuser multiple-input-multiple-output (MIMO) downlink transmission system with linear preceding, in accordance with an embodiment of the invention. Referring to FIG. 1A, there is shown a communication system 100 that may comprise a base station 102a and a plurality of users 122a, ..., 130a. In the communication system 100, the base station 102a may be equipped with M antennas and K users 122a, ..., 130a may each have a single antenna. In this implementation, the total number of users or receiver antennas may be equal or higher than the number of base station antennas, that is, $K \geq M$.

The base station 102a may comprise a plurality of channel encoders 104a, 106a, a user scheduler 108a, a plurality of modulators (MOD) 110a, ..., 112a, a power control block 114a, a beamforming or linear precoding block 116a, an uplink channel estimator block 152, a processor 154, a memory 156 and a range reduction algorithm block 160. Each of the plurality of users 122a, ..., 130a may comprise one of a plurality of demodulators (DEM) 132a, ..., 140a, and one of a plurality of channel decoders 142a, ..., 150a.

The channel encoders 104a, ..., 106a may comprise suitable logic, circuitry, and/or code that may be adapted to encode binary data for each of the K users in the communication system 100. The beamforming or linear precoding block 116a may comprise suitable logic, circuitry, and/or code that may be adapted to processes the user data symbols to separate signals intended for different users such that each user receives little or no interference from other users. With M antennas at the base station 102a, the beamforming or linear precoding block 116a may separate at most M different signals, that is, the base station 102a may transmit to at most M users at a time. Therefore, for each channel realization, the base station 102a may need to select M or less than M users among all the K users to transmit.

The user scheduler 108a may comprise suitable logic, circuitry, and/or code that may be adapted to find a best user group that optimizes certain performance criterion such as the sum throughput of the system, for example. In this regard, the user scheduler 108a may be adapted to perform the steps of a greedy user selection algorithm to find the best user group. The user scheduler 108a may utilize knowledge of the channel state information (CSI) provided by the uplink channel estimator block 152 when determining the best user group. For a time division duplex (TDD) system, the base station 102a may be adapted to estimate the uplink channel and use it as the downlink channel based on the channel reciprocity property between the uplink and downlink. The base station 102a may be assumed to have channel knowledge of every user through accurate uplink channel estimation.

The user scheduler 108a may be adapted to select a first user with the strongest channel gain and a second user with the next second strongest channel gain. The user scheduler 108a may be adapted to determine a first maximum system capacity based on the first user and a second maximum system capacity based on the second user. The user scheduler 108a may also be adapted to select the highest of the first maximum system capacity and the second maximum system capacity as the maximum system capacity to be supported by the communication system 100. In this regard, for a case when M=2, the user scheduler 108a may select the user group comprising a pair of users associated with the maximum system capacity selected.

The modulators 110a, ..., 112a may comprise suitable logic, circuitry, and/or code that may be adapted to modulate the binary data of each of the users selected by the user scheduler 108a. In this regard, the modulation operation on the binary data may result in a plurality of complex symbols, for example. The power control block 114a may comprise suitable logic, circuitry, and/or code that may be adapted to allocate different users with different power levels in accordance with their respective channel quality, for example.

The user scheduler 108a, the power control block 114a, and/or the beamforming or linear precoding block 116 may require knowledge of the state of the downlink channel. The uplink channel estimator block 152 may comprise suitable logic, circuitry, and/or code that may be adapted to estimate, store and/or transfer channel state information associated with the users 122a, ..., 130a. In this regard, the uplink channel estimator block 152 may be adapted to transfer the channel state information to the user scheduler 108a, the power control block 114a, and/or the beamforming or linear precoding block 116 when necessary.

The processor 154 may comprise suitable logic, circuitry, and/or code that may be adapted to process information and/or data associated with the generation of transmission signals at the base station 102a. The processor 154 may also be adapted to control at least a portion of the operations of the base station 102a, for example, the processor 154 may be adapted to maximize system capacity based on reducing a search range within which to find a group of signals having maximum channel sum transmission rate. The memory 156 may comprise suitable logic, circuitry, and/or code that may be adapted to store data and/or control information that may be utilized in the operation of at least a portion of the base station 102a.

The demodulators 132a, ..., 140a in the users 122a, ..., 130a may comprise suitable logic, circuitry, and/or code that may be adapted to demodulate the signals received from the base station 102a, for example. The channel decoders 142a, ..., 150a may comprise suitable logic, circuitry, and/or code that may be adapted to decode the demodulated signals from the demodulators 132a, ..., 140a into binary bit streams, for example.

The range reduction algorithm block 160 may comprise suitable logic, circuitry, and/or code that may be adapted to reduce the user search range from the plurality of users. A desired user group may be determined by searching among the L strongest users. The range reduction algorithm may be assumed to be carried out offline at the system design stage. Notwithstanding, an embodiment of the invention may incorporate an adaptive algorithm to update L at real time with online channel measurements while using the offline calculated user range as the initial value. Based on the reduction range [1: L], the search may be restricted within the first L strongest users for a user pair [$idx_1$, $idx_2$] that has the maximum instantaneous sum capacity.

FIG. 1B illustrates a block diagram of a finite rate multiuser communication environment that may be utilized in connection with an embodiment of the invention. Referring to FIG. 1B, there is shown a multiuser downlink communication system with a base station 170, a plurality of transmit antennas, $152_{1...M}$, and a plurality of receive antennas, $154_{1...K}$, one antenna for each of the K users.

The base station 170 may comprise suitable logic, circuitry and/or code that may be adapted to relay signals to and from mobile terminals or handsets within a given range. The operation of the base station 170 may be substantially similar to the operation of the base station 102a described in FIG. 1A. The plurality of transmit antennas $172_{1...M}$ may transmit processed RF signals to the plurality of receive antennas $174_{1...K}$. The plurality of receive antennas $174_{1...K}$ may each receive a portion of the transmitted signal.

The signal model may be represented as $$\begin{bmatrix} y_1 \\ y_2 \\ \vdots \\ y_k \end{bmatrix} = \begin{bmatrix} h_1 \\ h_2 \\ \vdots \\ h_k \end{bmatrix} x + n, \quad (1)$$

where $y_k$ (k=1, ..., K) is the received signal by user k, $h_k \in \mathbb{C}^{1 \times M}$ is the channel vector to user k, $x \in \mathbb{C}^{M \times 1}$ is the transmitted symbol vector by the base station 170, and $n \in \mathbb{C}^{K \times 1}$ is the additive white Gaussian noise (AWGN) with zero mean and unit variance. The transmitted symbols may satisfy a power constraint, P represented by $$E[x^H x] \leq P,$$

where $(\cdot)^H$ represents complex conjugate transpose.

Each element in $h_k$ may be assumed to be a zero-mean circularly symmetric complex Gaussian (ZMCSCG) random variable with unit variance. The users may be assumed to experience independent fading. The channel vectors $$\{h_k\}_{k=1}^{K}$$

may be statistically independent to each other. The channel state information (CSI), $h_k$, may be assumed to be known to user k, but not to other users. For a time division duplex (TDD) system, the base station may be adapted to estimate the uplink channel and use it as the downlink channel based on the channel reciprocity property between the uplink and downlink. The base station 170 may be assumed to have channel knowledge of every user through accurate uplink channel estimation.

The zero-forcing (ZF) linear precoder may achieve a sum capacity when the number of users, K, approach infinity. The ZF precoders may be adapted to provide near-optimal performance even with a limited number of users, for example, K=10 users. The zero-forcing precoders are a specific type of linear precoders. When the base station 170 decides to transmit to a group of users $D \subseteq \{1, ..., K\}$ with d=|D|≤K, a linear precoding scheme may linearly weigh the data symbols, $s=[s_1, ..., s_d]^T$, before they are transmitted from the base station 170 according to, $$x = FPs, \quad (2)$$

where x is the transmitted signal vector as in (1), $F=[f_1, ..., f_d]$ is the M×d linear precoding matrix with normalized columns ($\|f_k\|=1$) and $P=\text{diag}\{P_1, ..., P_d\}$ with $$\sum_{i=1}^{d} P_i \leq P$$

is the power control matrix that allocates transmit power to different users. The data symbols s may correspond to the data symbols $u_1 ... u_M$ that are generated by the plurality of modulators 110a ... 112a. The elements in the linear precoding matrix F may represent the plurality of weighing coefficients utilized by the precoder 116a. The nonzero elements in the diagonal matrix P may represent the plurality of scaling factors $p_1 ... p_M$ utilized by the power control block 114a. The received signal may be represented by the following equation:

$$\begin{bmatrix} y_1 \\ y_2 \\ \vdots \\ y_d \end{bmatrix} = \begin{bmatrix} h_1 \\ h_2 \\ \vdots \\ h_d \end{bmatrix} FPs + n. \quad (3)$$

A zero-forcing precoder may utilize the pseudo-inverse of the overall channel matrix $$H_D = [h_1^T, \ldots, h_d^T]^T$$

as the weighting matrix when $H_D$ may have full row rank according to the following equation:

$$W_D = H_D^+ = H_D^H (H_D H_D^H)^{-1}, \quad (4)$$

$$F_D = W_D \begin{bmatrix} \frac{1}{w_1} & & \\ & \ddots & \\ & & \frac{1}{w_d} \end{bmatrix}, \quad (5)$$

where $$\{w_i\}_{i=1}^d$$

are the columns of $W_D$. By defining $$\xi_i \triangleq \frac{1}{w_i} \quad (6)$$

and substituting (5) in (3), the received signal $y_i$ for each user with zero-forcing precoding may be represented according to the following expression:

$$y_i = \xi_i P_i s_i + n_i, \quad \forall i \in D. \quad (7)$$

The multiuser downlink channel may be represented as a set of parallel channels. The maximum sum rate of the given user group $D$, $C_D$ may be represented as $$C_D = \sum_{i \in D} \log(1 + \xi_i P_i), \quad (8)$$

where the optimal $P_i$ is given by a water-filling solution that may be represented as, $$P_i = \left(\mu - \frac{1}{\xi_i}\right)^+, \quad (9)$$

with a water level $\mu$ chosen to satisfy $$\sum_{i \in D} \left(\mu - \frac{1}{\xi_i}\right)^+ = P.$$

The maximum achievable sum rate for a given channel realization, C may be obtained by searching over all the possible user groups according to $$C = \max_{D \subseteq \{1, \ldots, K\}, |D| \leq M} C_D. \quad (10)$$

According to (10), for a given channel realization, the optimal brute-force user group selection for ZF preceding requires searching over all $$\sum_{i=1}^M \binom{K}{i}$$

possible user groups to find the user group with the largest sum rate. In addition, for each candidate user group, a water-filling solution needs to be computed to obtain the corresponding sum rate. As a result, a fairly high computational cost may be expected, especially when K is large.

A greedy user group selection scheme may be combined with search range reduction, where the L strongest users are selected. When number of antennas at the base station 170, M=2, the number of candidate user groups may be L−1 as opposed to $$\frac{K(K+1)}{2}$$

for the brute-force search algorithm. A significant reduction in searching complexity may be achieved, especially when L<<K. Third-generation cellular communication standards such as WCDMA and CDMA 2000 typically employ two antennas at the base station 170. Notwithstanding, an embodiment of the invention may extend the algorithm to the case with any M number of antennas at the base station 170.

FIG. 2A is a flowchart illustrating greedy user group selection scheme with range reduction, in accordance with an embodiment of the invention. Referring to FIG. 2A, exemplary steps may start at step 200. In step 202, the plurality of K users may be sorted according to their channel gain. The CSI may be assumed to be available at the base station 102*a* (FIG. 1A), in a sense that the multiple-input-single-output (MISO) channel impulse response $h_k \in \mathbb{C}^{1 \times 2}$ (M=2) of each user is known at the transmitter. For each channel realization, the users may be sorted and indexed in terms of their channel gains according to the following expression:

$$\gamma_1 \geq \gamma_2 \geq \ldots \geq \gamma_K. \quad (11)$$

In step 204, a range reduction algorithm may be applied to determine the reduced user search range L. A desired user group may be determined by searching among the L strongest users. In accordance with an embodiment of the invention, the step 204 may be carried out offline at the system design stage. Notwithstanding, an embodiment of the invention may incorporate an adaptive algorithm to update L at real time with online channel measurements while using the offline calculated user range as the initial value. Based on the reduction range [1:L] obtained from step 204, the search may be restricted within the first L strongest users for a user pair [idx$_1$, idx$_2$] that has the maximum instantaneous sum capacity.

U.S. application Ser. No. 11/231,699 filed Sep. 21, 2005, provides a detailed description of a range reduction algorithm, and is hereby incorporated by reference in its entirety.

In step 206, the maximum system capacity $C_{max}$ may be initialized to $C_{max}=C(1)$, which corresponds to the case where the base station 102a only transmits to the strongest user according to the following expression:

$$C_{max}=C(1)=\log_2(1+\rho \cdot \gamma_1), \quad (12)$$

where $\rho$ is the average signal to noise ratio (SNR) of the system. The optimal user index may be initialized to be $[idx_1, idx_2]=[1,0]$ with $idx_2=0$ representing that there is no second user. In step 208, it may be determined whether C(1, k) is greater than the system maximum sum capacity $C_{max}$, which may be given by the expression:

$$C(1, k) = \log_2\left(1 + \frac{1}{2}\rho \cdot \gamma_1 \cdot \alpha_{1,k}\right) + \log_2\left(1 + \frac{1}{2}\rho \cdot \gamma_k \cdot \alpha_{1,k}\right), \quad (13)$$
$$k = 2, \ldots, L,$$

where $\rho$ is the average SNR of the system, and $\alpha_{1,k}$ is a parameter that describes the orthogonality between $h_1$ and $h_k$, according to the following expression:

$$\alpha_{1,k} = 1 - \frac{|\langle h_1, h_k \rangle|^2}{\|h_1\|^2 \cdot \|h_k\|^2}. \quad (14)$$

If the system capacity C(1, k) is greater than the current maximum capacity $C_{max}$, control passes to step 210. In step 210, the maximum capacity $C_{max}$ may be updated with C(1, k) and the optimal user index $[idx_1, idx_2]$ may be updated by [1, k]. Control then passes to step 212. If the system capacity C(1, k) is not greater than the current maximum capacity $C_{max}$, control passes to step 212.

In step 212, it may be determined whether the iteration variable k is less than or equal to the number of reduced strongest users L. If the iteration variable k is less than or equal to the number of reduced strongest users L, control passes to step 214. In step 214, the iteration variable k may be incremented by 1 and control passes to step 208. If the iteration variable k is not less than or equal to the number of reduced strongest users L, control passes to step 216.

In step 216, an optimal user pair index $[idx_1, idx_2]$ may be determined to calculate the maximum system sum capacity. If both $idx_1$ and $idx_2$ are valid indices between 1 and K, then the base station 102a may be adapted to communicate to both user $idx_1$ and user $idx_2$ at the same time utilizing spatial multiplexing. The transmitter precoding matrix F may be formed according to the following expression:

$$F = \left[v_{idx_2}^\perp v_{idx_1}^\perp\right]^* / \sqrt{2}, \quad (15)$$

where vectors $v_{idx_1}$ and $v_{idx_2}$ are the unit norm directional vectors given by the expression:

$$v_{idx_1} = \frac{h_{idx_1}}{\|h_{idx_1}\|}, \quad (16)$$

$$v_{idx_2} = \frac{h_{idx_2}}{\|h_{idx_2}\|},$$

The precoder provided in equation (15) is equivalent to the form given by (5). If $idx_2$ is equal to 0, the base station 102a may be communicating only to the strongest user or the $idx_1{}^{th}$ user providing better sum capacity than using spatial multiplexing. The precoding matrix F may be chosen using the following expression:

$$F=v_{idx_1}^* \quad (17)$$

Control then passes to end step 218.

FIG. 2B is a flow chart that illustrates exemplary steps in a method for a range reduction scheme for user selection in a multiuser MIMO downlink transmission, in accordance with an embodiment of the invention. Referring to FIG. 2B, in step 252, channel state information (CSI) may be derived, step 254 comprises a search for optimal users, step 256 may comprise computing a cumulative distribution function (CDF) among user indexes, and step 258 may comprise computing a reduced search range.

In step 252 CSI may be derived based on a plurality of T independent channel realizations, for example:

$$\{h_k(t)\}_{k=1}^K, \quad (18)$$
$$t = 1, \ldots, T.$$

The CSI may comprise channel gain, or signal gain, information. For each channel realization, users among the full set of K users may be sorted, and indexed, in an order based on the values of the channel gains corresponding to each of the K users. For example, a user with a larger value of corresponding channel gain may be placed in the sorted list at a higher index than a user with a smaller value of corresponding channel gain as in the following expression:

$$\gamma_1(t) \geq \gamma_2(t) \geq \ldots \geq \gamma_K(t), t=1, \ldots, T, \quad (19)$$

where $$\gamma_K(t) \triangleq \|h_K(t)\|^2.$$

The channel measurement may be carried out either by offline channel sounding or by online channel estimation. In a time division duplex (TDD) system, the base station may compute a channel estimate associated with an uplink channel, and use the uplink channel estimation as an approximation of channel estimates for the corresponding downlink channel based on a channel reciprocity property between the uplink and downlink channels.

In step 254, for each of the channel realizations according to (18), the optimal user group may be determined according to (8) and (10) as in the following expression:

$$D_{opt}(t) = \arg\max_{D \subseteq \{1,\ldots,K\}, |D| \leq M} C_D(t), t = 1, \ldots, T, \text{ where} \quad (20)$$

$$C_D(t) = \sum_{i \in D} \log(1 + \xi_i(t)P_i(t)), \quad (21)$$

and where $\xi_i(t)$ and $P_i(t)$ may be as defined in (6) and (9), respectively. $D_{opt}(t)$ may be represented as a row vector that contains indexes corresponding to the users contained in the optimal group for channel realization t. By representing the index of the optimal users as a random variable X, the vector as in the following expression:

$$D_{opt} \triangleq [D_{opt}(1), D_{opt}(2), \ldots, D_{opt}(T)] \qquad (22)$$

may contain samples of the random variable X.

In step 256, an estimate of the cumulative distribution function (CDF) $\hat{F}(X)$ of X may be produced based on samples from the optimal user index vector, X, that was determined in step 254 according to (22).

In step 258, a threshold, $\partial_{th} \in (0,1]$, may be selected. The reduced search range may then be determined by the relationship as in the following expression:

$$L = \hat{F}^{-1}(\partial_{th}), \qquad (23)$$

where $\hat{F}^{-1}(.)$ is the inverse function of $\hat{F}(.)$, for example:

$$X = \hat{F}^{-1}(\hat{F}(X))$$

The threshold may be a measure of the likelihood that a channel realization, evaluated among the full range of K users, will comprise the subset of L users.

In various embodiments of the invention, expression (23) may be implemented by tabulating the CDF $\hat{F}(X)$ in terms of the random variable comprising the index of optimal users X, and searching for a value of X that corresponds to $\partial_{th}$. The threshold $\partial_{th}$ may provide a measure of the statistical likelihood that the sum rate, computed among of subset of L users in the reduced searching range, may approach the optimal performance computed among the full group of K users.

While the exemplary embodiment of the invention illustrates a search range reduction scheme a system that utilizes a simple zero-forcing precoder, the invention is not so limited. Various embodiments of the invention may also be utilized with other more sophisticated precoders, for example a minimum mean squared error (MMSE) precoder, a Tomlinson-Harashima precoding (THP) precoder, or a sphere encoding precoder, for example.

FIG. 3 is a graph 302 illustrating a comparison of sum capacity of a system using an optimal brute force user selection with L=100, a greedy user selection with L=10, and a greedy user selection with L=5, in accordance with an embodiment of the invention. Referring to FIG. 3, there is shown a waveform 304 representing sum capacity of a system using an optimal brute force user selection with L=100, a waveform 306 representing sum capacity of a system using greedy user selection with L=10, and a waveform 308 representing sum capacity of a system using greedy user selection with L=5.

Referring to FIG. 3, the graph 302 illustrates comparison of sum capacity of a system for a single base station and K=100 users, for example. The base station, for example, base station 102*a* may be equipped with M=2 antennas, and each user may be equipped with a single antenna. The channels are generated to be flat Rayleigh faded. The transmit antennas at the base station 102*a* may be assumed to be placed apart enough so as to experience independent fading. The modulation format may be quadrature phase-shift keying (QPSK).

TABLE 1 illustrates a comparison of user selection schemes and the corresponding search complexity for M=2, K=100.

TABLE 1

| | Selection schemes | | |
| --- | --- | --- | --- |
| | Brute force with L = 100 | Greedy search with L = 10 | Greedy search with L = 5 |
| The number of candidate user groups | 5050 | 9 | 4 |

Referring to TABLE 1, there is shown that the number of candidate user groups may be $$\frac{L(L+1)}{2}$$

for the brute-forcing search algorithm while the greedy search algorithm may have only L−1 candidate user groups.

FIG. 4 is a graph 402 illustrating a comparison of bit error rate (BER) of a system using an optimal brute force user selection with L=100, greedy user selection with L=10 and greedy user selection with L=5, in accordance with an embodiment of the invention. Referring to FIG. 4, there is shown a waveform 404 representing BER of a system using an optimal brute force user selection with L=100, a waveform 406 representing BER of a system using a greedy search algorithm with L=10, and a waveform 408 representing BER of a system using a greedy search algorithm with L=5.

Referring to FIG. 4, the graph 402 illustrates comparison of BER of a system for a single base station and K=100 users, for example. The base station, for example, base station 102*a* may be equipped with M=2 antennas, and each user may be equipped with a single antenna. The channels are generated to be flat Rayleigh faded. The transmit antennas at the base station 102*a* may be assumed to be spaced or separated apart enough so as to experience independent fading. The modulation format may be quadrature phase-shift keying (QPSK).

FIG. 3 and FIG. 4 illustrate performance of various user group selection schemes for zero-forcing precoding in terms of sum capacity and bit error rate (BER), respectively. The greedy search user group selection scheme with a reduced search range of L=10 or L=5 may provide close to optimal performance of the brute-forcing search scheme with a full search range L=100, both in terms of capacity and BER. The brute-forcing search algorithm may need to search over $$\frac{L(L+1)}{2}$$

user groups for M=2, whereas the greedy search algorithm may only have L−1 candidate user groups. In accordance with an embodiment of the invention, the user selection technique may be capable of achieving near-optimal performance while significantly reducing the computational burden on the base station. Compared to the brute-force user selection algorithm, the selection scheme may significantly reduce the computational complexity to L−1(K>>L), where K represents the number of users.

FIG. 5 is a flowchart illustrating a greedy user group selection scheme with range reduction in TDD multiuser MIMO downlink transmission, in accordance with an embodiment of the invention. Referring to FIG. 5, there is shown exemplary steps that start at step 502. In step 504, a plurality of signals may be sorted based on a channel gain corresponding to each of the plurality of signals. In step 506, a range reduction algorithm may be applied to the sorted plurality of users. A desired user group may be determined by searching among the L strongest users and may be carried out offline at the system design stage. Notwithstanding, an embodiment of the invention may incorporate an adaptive algorithm to update L at real time with online channel measurements while using the offline calculated user range as the initial value. Based on the reduced search range [1:L], the search may be restricted within the first L strongest users for a user pair [$idx_1$, $idx_2$] that has the maximum instantaneous sum capacity. In step 508, a single signal for a single user may be selected corresponding to a channel gain that is greater than a channel gain corresponding to a remaining portion of the reduced search range. In step 510, a single system capacity may be maximized based on the channel gain corresponding to the selected single signal for the single user.

In step 512, the maximized channel capacity of the single signal for the single user may be compared with a maximum system capacity of the single signal for the single user and at least one other signal for one other user within a remaining portion of the reduced search range. The maximum system capacity may be obtained by searching over all the possible user groups according to the following expression:

$$C = \max_{D \subseteq \{1,\ldots,K\}, |D| \leq M} C_D. \quad (10)$$

In step 514, if the single signal for the single user within the reduced search range provides the maximized system capacity, the system capacity of the selected single signal for the single user within the reduced search range may be set as the maximum system capacity. If the single signal for the single user and at least one other signal for one other user within the remaining portion of the reduced search range provides the maximized system capacity, a system capacity of the single signal for the single user and at least one other signal for one other user within the remaining portion of the reduced search range may be set as the maximum system capacity.

In step 516, a user pair index [$idx_1$, $idx_2$] corresponding to the maximized system capacity may be determined. If both $idx_1$ and $idx_2$ are valid indices between 1 and K, then the base station 102a (FIG. 1A) may be adapted to communicate to both user $idx_1$ and user $idx_2$ at the same time utilizing spatial multiplexing. The transmitter precoding matrix F may be formed according to the following expression:

$$F = [v_{idx_2}^+ v_{idx_1}^+]^* / \sqrt{2}, \quad (15)$$

where vectors $v_{idx_1}$ and $v_{idx_2}$ are the unit norm directional vectors given by the following expression:

$$v_{idx_1} = \frac{h_{idx_1}}{\|h_{idx_1}\|}, v_{idx_2} = \frac{h_{idx_2}}{\|h_{idx_2}\|}, \quad (16)$$

If $idx_2$ is equal to 0, the base station 102a may be communicating only to the strongest user or the $idx^{th}_1$ user providing better sum capacity than using spatial multiplexing. The precoding matrix F may be chosen using the following expression:

$$F = v_{idx_1}^* \quad (17)$$

The greedy search user group selection scheme with a reduced search range of L=10 or L=5 may provide close to optimal performance of the brute-forcing search scheme with a full search range L=100, both in terms of capacity and BER. The brute-forcing search algorithm may need to search over $$\frac{L(L+1)}{2}$$

user groups for M=2, whereas the greedy search algorithm may only have L−1 candidate user groups.

In accordance with an embodiment of the invention, a system for processing signals in a communication system may comprise circuitry that maximizes system capacity for a time division duplex (TDD) multiple-input multiple-output (MIMO) system, based on a single signal for a single user within a reduced search range provides a maximized system capacity or the single signal for the single user and at least one other signal for one other user within a remaining portion of the reduced search range.

For a time division duplex (TDD) system, the base station 102a (FIG. 1A) may be adapted to estimate the uplink channel and use it as the downlink channel based on the channel reciprocity property between the uplink and downlink. The base station 102a may be assumed to have channel knowledge of every user through accurate uplink channel estimation. The system may comprise circuitry that generates the reduced search range by sorting a plurality of signals based on a channel gain corresponding to each of the plurality of signals. The system may further comprise circuitry that generates the single signal for the single user from the reduced search range by sorting a plurality of signals based on a channel gain corresponding to each of the plurality of signals.

A desired user group may be determined by searching among the L strongest users and may be carried out offline at the system design stage. Notwithstanding, an embodiment of the invention may incorporate an adaptive algorithm that updates L in real time, accordingly, or at a specified time instant, with online channel measurements while using the offline calculated user range as the initial value. Based on the reduced search range [1:L], the search may be restricted within the first L strongest users for a user pair [$idx_1$, $idx_2$] that has the maximum instantaneous sum capacity.

The system may comprise circuitry that selects the single signal for the single user from the reduced search range corresponding to a channel gain that is greater than a channel gain corresponding to a remaining portion of the reduced search range. The system may further comprise circuitry that determines the channel gain associated with each of the plurality of signals based on a plurality of channel measurements. The system may comprise circuitry that maximizes system capacity based on a channel gain corresponding to the selected single signal for the single user within the reduced search range. The system may further comprise circuitry that maximizes system capacity based on a channel gain corresponding to the single signal for the single user and at least said one other signal for one other user within the remaining portion of the reduced search range.

Another embodiment of the invention may provide a machine-readable storage, having stored thereon, a computer program having at least one code section executable by a machine, thereby causing the machine to perform the steps as described above for a greedy search user group selection scheme with range reduction in TDD multiuser MIMO downlink transmission.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, the method comprising:
    performing by one or more processors and/or circuits, functions comprising:
        maximizing system capacity for a time division duplex (TDD) multiple-input multiple-output (MIMO) system, based on one of: a single signal for a single user within a reduced search range, or a single signal for said single user within a portion of said reduced search range and at least one other signal for one other user within a remaining portion of said reduced search range.

2. The method according to claim 1, said functions comprising generating said reduced search range by sorting a plurality of signals based on a channel gain corresponding to each of said plurality of signals.

3. The method according to claim 2, said functions comprising generating said single signal for said single user from said reduced search range by sorting a plurality of signals based on a channel gain corresponding to each of said plurality of signals.

4. The method according to claim 2, said functions comprising determining said channel gain associated with each of said plurality of signals based on a plurality of channel measurements.

5. The method according to claim 1, said functions comprising selecting said single signal for said single user from said portion of said reduced search range corresponding to a channel gain that is greater than a channel gain corresponding to said remaining portion of said reduced search range.

6. The method according to claim 1, said functions comprising maximizing system capacity based on a channel gain corresponding to said selected single signal for said single user within said reduced search range.

7. The method according to claim 1, said functions comprising maximizing system capacity based on a channel gain corresponding to said single signal for said single user within said portion of said reduced search range and said at least one other signal for said one other user within said remaining portion of said reduced search range.

8. A non-transitory computer-readable storage medium having stored thereon, a computer program having at least one code section for processing signals in a communication system, the at least one code section being executable by a computer system for causing the computer system to perform steps comprising:
    maximizing system capacity for a time division duplex (TDD) multiple-input multiple-output (MIMO) system, based on one of: a single signal for a single user within a reduced search range, or a single signal for said single user within a portion of said reduced search range and at least one other signal for one other user within a remaining portion of said reduced search range.

9. The non-transitory computer-readable storage medium according to claim 8, wherein said at least one code section comprises code for generating said reduced search range by sorting a plurality of signals based on a channel gain corresponding to each of said plurality of signals.

10. The non-transitory computer-readable storage medium according to claim 9, wherein said at least one code section comprises code for generating said single signal for said single user from said reduced search range by sorting a plurality of signals based on a channel gain corresponding to each of said plurality of signals.

11. The non-transitory computer-readable storage medium according to claim 9, wherein said at least one code section comprises code for determining said channel gain associated with each of said plurality of signals based on a plurality of channel measurements.

12. The non-transitory computer-readable storage medium according to claim 8, wherein said at least one code section comprises code for selecting said single signal for said single user from said portion of said reduced search range corresponding to a channel gain that is greater than a channel gain corresponding to said remaining portion of said reduced search range.

13. The non-transitory computer-readable storage medium according to claim 8, wherein said at least one code section comprises code for maximizing system capacity based on a channel gain corresponding to said selected single signal for said single user within said reduced search range.

14. The non-transitory computer-readable storage medium according to claim 8, wherein said at least one code section comprises code for maximizing system capacity based on a channel gain corresponding to said single signal for said single user within said portion of said reduced search range and said at least one other signal for said one other user within said remaining portion of said reduced search range.

15. A system for processing signals in a communication system, the system comprising:
    one or more circuits that are operable to maximize system capacity for a time division duplex (TDD) multiple-input multiple-output (MIMO) system, based on one of: a single signal for a single user within a reduced search range, or a single signal for said single user within a portion of said reduced search range and at least one other signal for one other user within a remaining portion of said reduced search range.

16. The system according to claim 15, wherein said one or more circuits are operable to generate said reduced search range by sorting a plurality of signals based on a channel gain corresponding to each of said plurality of signals.

17. The system according to claim 16, wherein said one or more circuits are operable to generate said single signal for said single user from said reduced search range by sorting a plurality of signals based on a channel gain corresponding to each of said plurality of signals.

18. The system according to claim 16, wherein said one or more circuits are operable to determine said channel gain associated with each of said plurality of signals based on a plurality of channel measurements.

19. The system according to claim 15, wherein said one or more circuits are operable to select said single signal for said single user from said portion of said reduced search range corresponding to a channel gain that is greater than a channel gain corresponding to said remaining portion of said reduced search range.

20. The system according to claim 15, wherein said one or more circuits are operable to maximize system capacity based on a channel gain corresponding to said selected single signal for said single user within said reduced search range.

21. The system according to claim 15, wherein said one or more circuits are operable to maximize system capacity based on a channel gain corresponding to said single signal for said single user within said portion of said reduced search range and said at least one other signal for said one other user within said remaining portion of said reduced search range.

* * * * *